(12) United States Patent
Hair

(10) Patent No.: US 10,794,143 B2
(45) Date of Patent: Oct. 6, 2020

(54) SUB-SURFACE SAFETY VALVE FLAPPER SLEEVE

(71) Applicant: Michael Hair, Tulsa, OK (US)

(72) Inventor: Michael Hair, Tulsa, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/727,000

(22) Filed: Oct. 6, 2017

(65) Prior Publication Data
US 2019/0107205 A1 Apr. 11, 2019

(51) Int. Cl.
E21B 34/06 (2006.01)
F16K 1/12 (2006.01)
F16K 1/18 (2006.01)

(52) U.S. Cl.
CPC .............. *E21B 34/06* (2013.01); *F16K 1/123* (2013.01); *F16K 1/18* (2013.01); *E21B 2200/05* (2020.05)

(58) Field of Classification Search
CPC .......................... E21B 34/06; E21B 2034/005
See application file for complete search history.

(56) References Cited

U.S. PATENT DOCUMENTS

| 3,845,818 | A |   | 11/1974 | Deaton |          |
|-----------|---|---|---------|--------|----------|
| 4,134,455 | A | * | 1/1979  | Read   | E21B 34/12 |
|           |   |   |         |        | 166/334.1 |
| 4,376,464 | A | * | 3/1983  | Crow   | E21B 34/101 |
|           |   |   |         |        | 166/324 |
| 4,457,376 | A |   | 7/1984  | Carmody et al. |  |
| 4,825,902 | A |   | 5/1989  | Helms  |          |
| 2008/0245531 | A1 |   | 10/2008 | Noske et al. |  |
| 2015/0204163 | A1 | * | 7/2015 | Hill | E21B 34/14 |
|           |   |   |         |        | 166/381 |
| 2017/0356272 | A1 | * | 12/2017 | Pinard | E21B 34/10 |
| 2018/0238139 | A1 | * | 8/2018 | Gao | E21B 33/14 |

FOREIGN PATENT DOCUMENTS

WO      WO0112949 A2      2/2001

OTHER PUBLICATIONS

International Search Report and Written Opinion for International Application No. PCT/US2018/049492; International Filing Date Sep. 5, 2018; Report dated Dec. 24, 2018; (pp. 1-13).

* cited by examiner

Primary Examiner — D. Andrews
(74) Attorney, Agent, or Firm — Cantor Colburn LLP

(57) ABSTRACT

A flapper valve system including a valve body having a valve seat, and a flapper base connected to the valve body. The flapper base supports a flapper selectively positionable on the valve seat. A flapper sleeve includes a first end arranged adjacent the flapper base, a second end, and an intermediate portion having an opening receptive of the flapper. The first end includes a flow tube travel limiter.

15 Claims, 6 Drawing Sheets

SUB-SURFACE SAFETY VALVE FLAPPER SLEEVE

BACKGROUND

In the resource recovery and exploration industry, valves are frequently employed to control fluid flow into and out of a formation. A variety of valve types may be utilized depending upon a number of factors including fluid type, type of control, operation and the like. For example, a flapper type valve may be employed as a safety valve. The flapper is biased in a closed position and may be opened by inserting a flow tube into a valve housing. The flow tube opens the flapper and provides protection from debris to valve components.

The use of the flow tube requires the valve housing to have a length that is greater than a size of the flapper. Additionally, the flow tube requires an energization over a long distance in order to extend into the housing and cover the flapper. The need for a larger housing and long activation distance increases costs associated with both the manufacture and use of conventional flapper valves. Accordingly, the art would be receptive to a flapper valve that includes a geometry that reduces costs without a substantial reduction in performance.

SUMMARY

Disclosed is a flapper valve system including a valve body having a valve seat, and a flapper base connected to the valve body. The flapper base supports a flapper selectively positionable on the valve seat. A flapper sleeve includes a first end arranged adjacent the flapper base, a second end, and an intermediate portion having an opening receptive of the flapper. The first end includes a flow tube travel limiter.

Also disclosed is a resource exploration and recovery system includes a first system, and a second system including a plurality of tubulars fluidically connected to the first system. At least one of the plurality of tubulars includes a flapper valve system including a valve body having a valve seat. A flapper base is connected to the valve body. The flapper base supports a flapper selectively positionable on the valve seat. A flapper sleeve includes a first end arranged adjacent the flapper base a second end and an intermediate portion having an opening receptive of the flapper. The first end includes a flow tube travel limiter.

Further disclosed is a method of activating a flapper valve includes inserting a flow tube through a valve body, engaging a flapper supported by a flapper base with the flow tube, shifting the flapper from a first position, to a second position with the flow tube, and limiting insertion of the flow tube at a first end of a flow sleeve abutting the flapper base.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
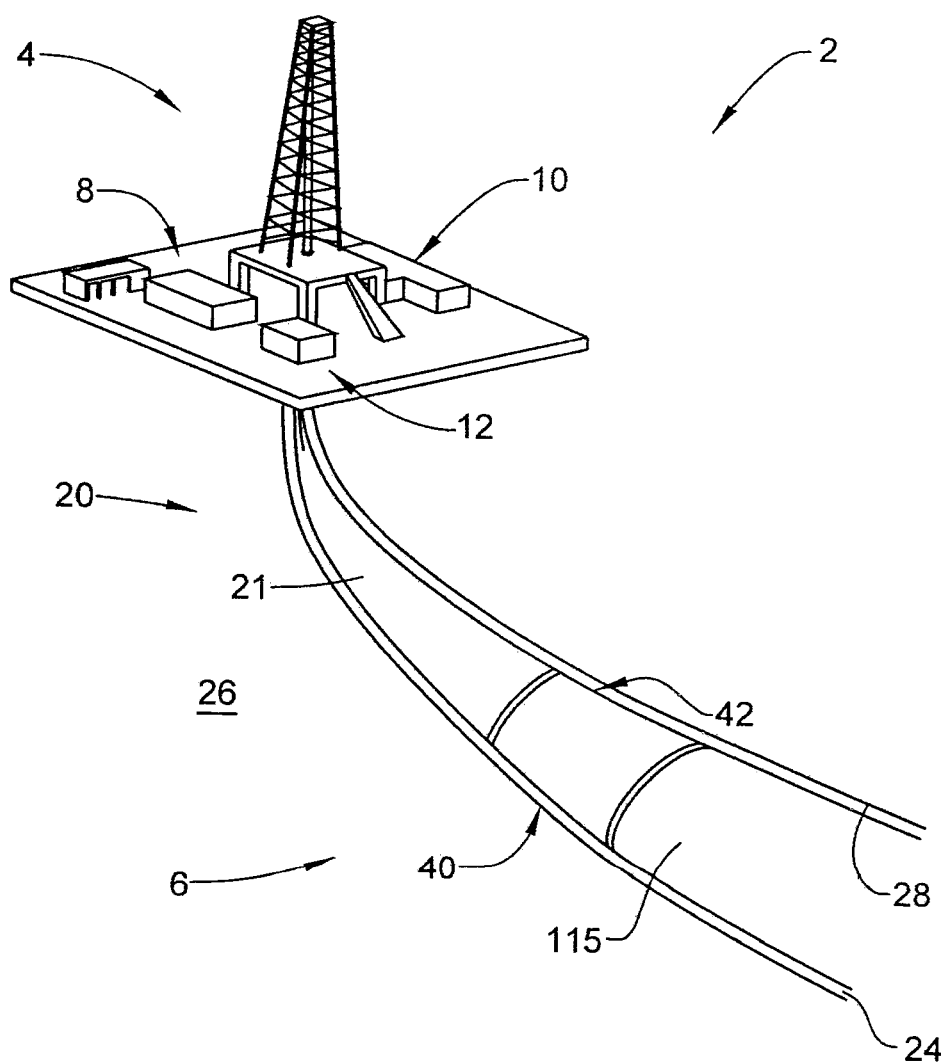
FIG. 1 depicts a resource exploration and recovery system including a flapper valve system, in accordance with an aspect of an exemplary embodiment.

A resource exploration and recovery system, in accordance with an exemplary embodiment, is indicated generally at 2, in FIG. 1. Resource exploration and recovery system 2 should be understood to include well drilling operations, resource extraction and recovery, $CO_2$ sequestration, and the like. Resource exploration and recovery system 2 may include a first system 4 which, in some environments, may take the form of a surface system operatively and fluidically connected to a second system 6 which, in some environments, may take the form of a downhole system. First system 4 may include pumps 8 that aid in completion and/or extraction processes as well as fluid storage 10. Fluid storage 10 may contain a stimulation fluid which may be introduced into second system 6. First system 4 may also include a control system 12 that may monitor and/or activate one or more downhole operations.

Second system 6 may include a tubular string 20 formed from a plurality of tubulars, one of which is indicated at 21 that is extended into a wellbore 24 formed in formation 26. Wellbore 24 includes an annular wall 28. Tubular string 20 includes a flapper valve system 40 coupled to tubular 21. Flapper valve system 40 includes a valve housing 42 that supports a plurality of valve components as will be discussed herein.

Figure 2:
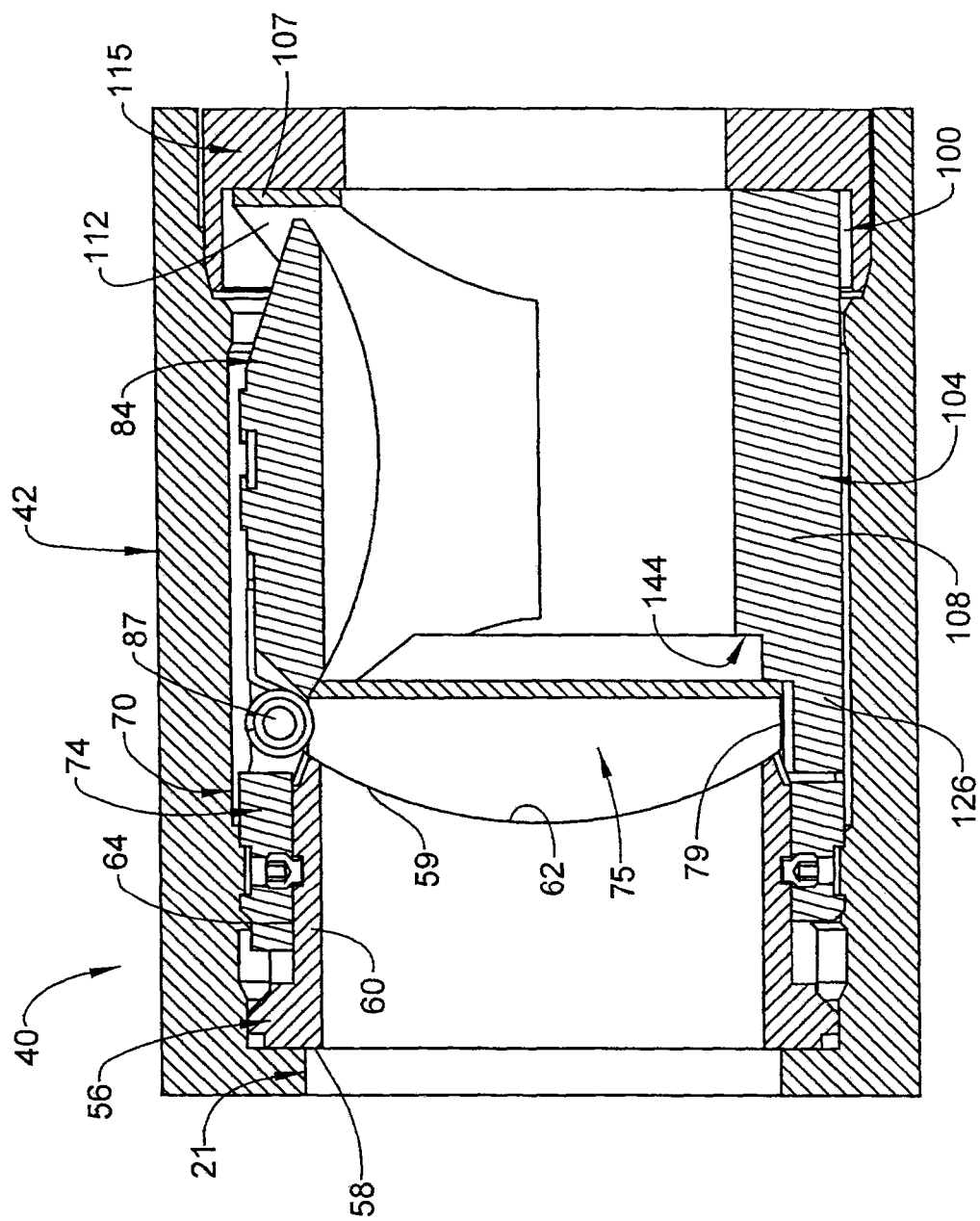
FIG. 2 depicts a cross-sectional view of the flapper valve system, in accordance with an exemplary embodiment.
Figure 4:
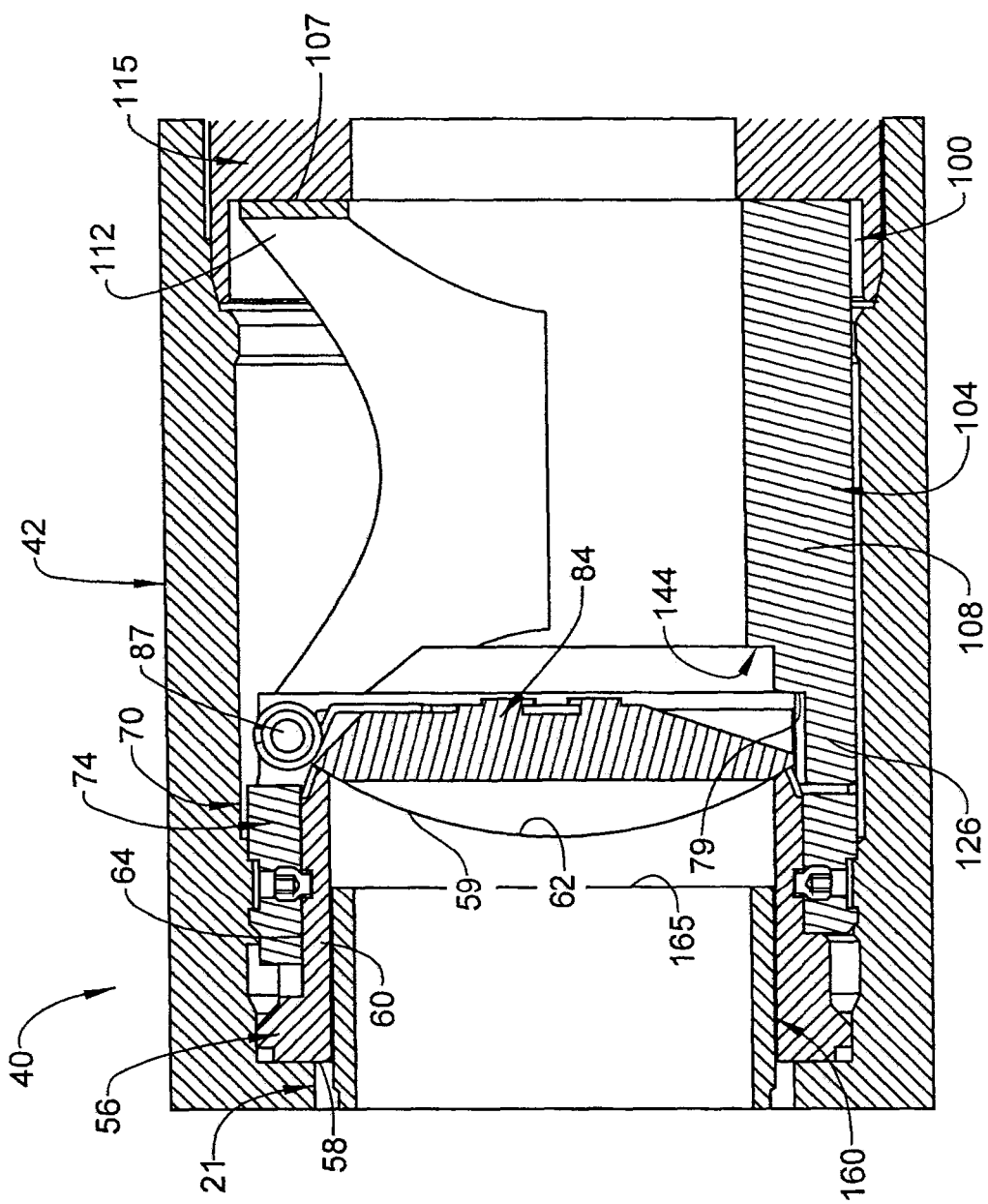
FIG. 4 depicts the flapper valve system of FIG. 2 illustrating a flapper in a closed configuration.

Referencing FIG. 2, valve housing 42 of flapper valve system 40 surrounds a valve body 56 having a first end section 58, a second end section 59 and an intermediate section 60 extending therebetween. Second end section 59 includes a valve seat 62. Intermediate section 60 includes an outer surface 64. A flapper base 70 is mechanically connected to valve body 56. Flapper base 70 includes a first section 74 connected to outer surface 64 and a second section 75 that surrounds valve seat 62. Second section 75 includes an annular wall 79 defining an opening (not separately labeled). A flapper 84 is connected to flapper base 70 through a hinge 87. Flapper 84 is selectively shiftable between a first or open configuration (FIG. 2) and a closed configuration (FIG. 4).

Figure 3:
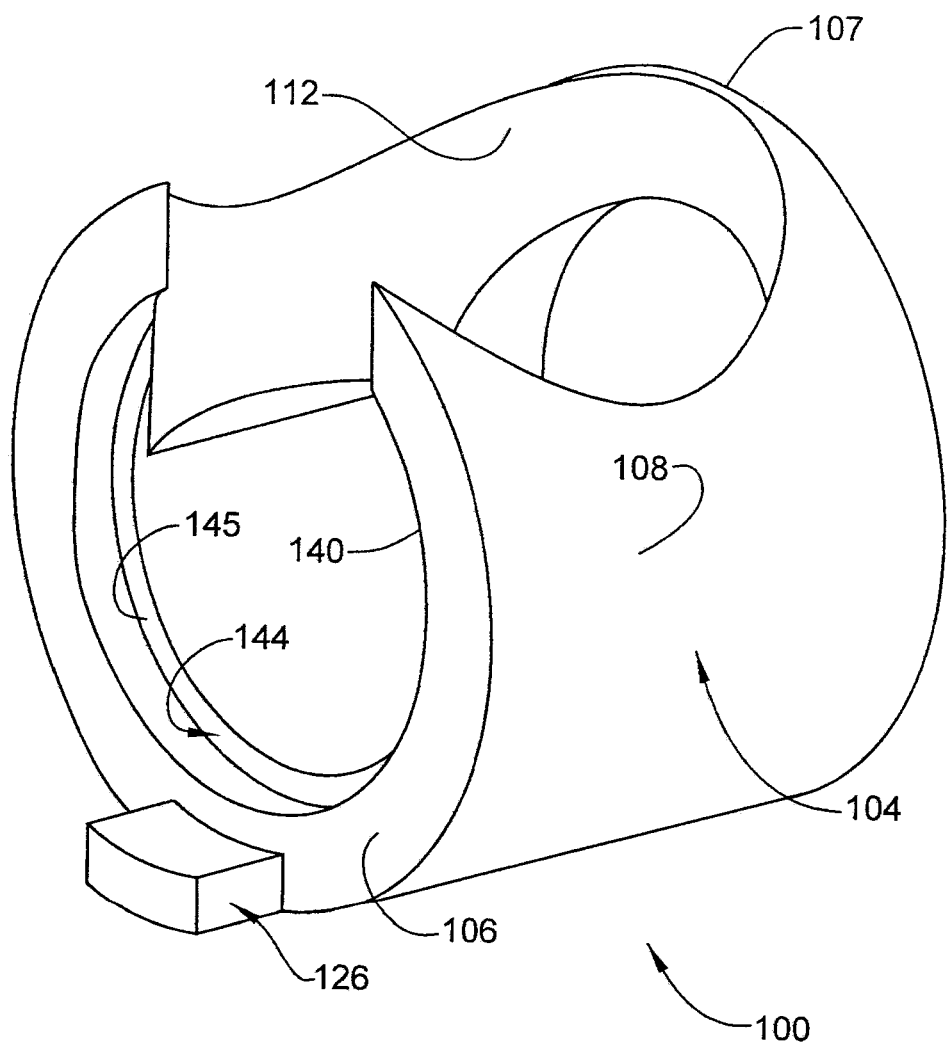
FIG. 3 depicts a flapper sleeve of the flapper valve system of FIG. 2, in accordance with an aspect of an exemplary embodiment.

In accordance with an aspect of an exemplary embodiment, flapper valve system 40 includes a flapper sleeve 100. Referring to FIG. 3, and with continued reference to FIG. 2, flapper sleeve 100 includes a sleeve body 104 having a first end 106, a second end 107 and an intermediate portion 108 extending therebetween. First end 106 may define an outlet and second end 107 may define an inlet. An opening 112 is formed in intermediate portion 108 and is receptive to flapper 84. Flapper sleeve 100 is arranged between flapper base 70 and another one of tubulars 115.

In further accordance with an exemplary aspect, flapper sleeve 100 includes a key element 126 extending axially outwardly from first end 106. Key element 126 may be received in a recess (not separately labeled) of flapper base

70. Key element 126 locates, and restricts relative rotation of, flapper base 70 and flapper sleeve 100 such that flapper 84 may readily and unobstructively transition between the open configuration and the closed configuration. First end 106 includes a fluid passage 140 having a first diameter (not separately labeled).

In still further accordance with an exemplary aspect, flapper sleeve 100 includes a flow tube travel limiter 144 arranged adjacent to first end 106. Flow tube travel limiter 144 is defined by a recess 145 forming a second diameter (not separately labeled) that is smaller than the first diameter. As will be detailed herein, flow tube travel limiter 144 limits or retrains axial ingress of a flow tube 160 (FIG. 4) into flapper sleeve 100.

Figure 5:
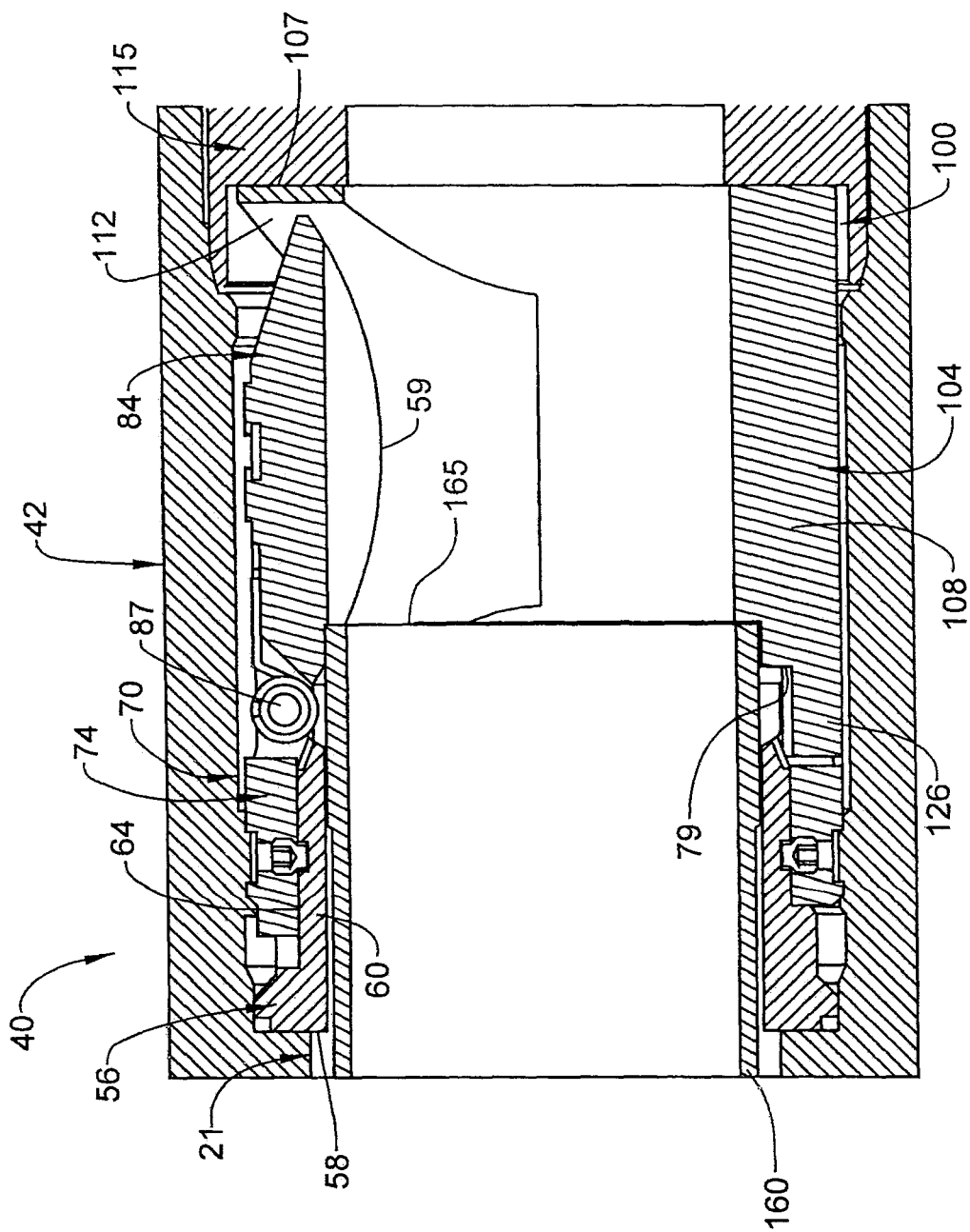
FIG. 5 depicts a flow tube passing into the flapper valve system of FIG. transitioning the flapper to an open configuration.

With reference to FIG. 4 and with continued reference to FIGS. 1-3, flow tube 160 is extended towards flapper valve system 40. Flow tube 160 passes through valve body 56, toward flapper base 70. A terminal end 165 of flow tube 160 engages flapper 84. Flow tube 160 continues moving toward flapper sleeve 100, pushing or urging flapper 84 toward the open configuration as shown in FIG. 5. Axial travel of flow tube 160 is limited by flow tube travel limiter 144. That is, once terminal end 165 engages flow tube travel limiter 144, further movement of flow tube 160 is restricted. In this manner, flow tube 160 extends only partially into flapper sleeve 100. In the exemplary aspect shown, flow tube 160 extends into flapper sleeve 100 a distance sufficient to cover hinge 87. Thus, flow tube 160 may limit exposure of hinge 87 to debris or other elements that may be entrained in fluids passing through flapper valve system 40.

Figure 6:
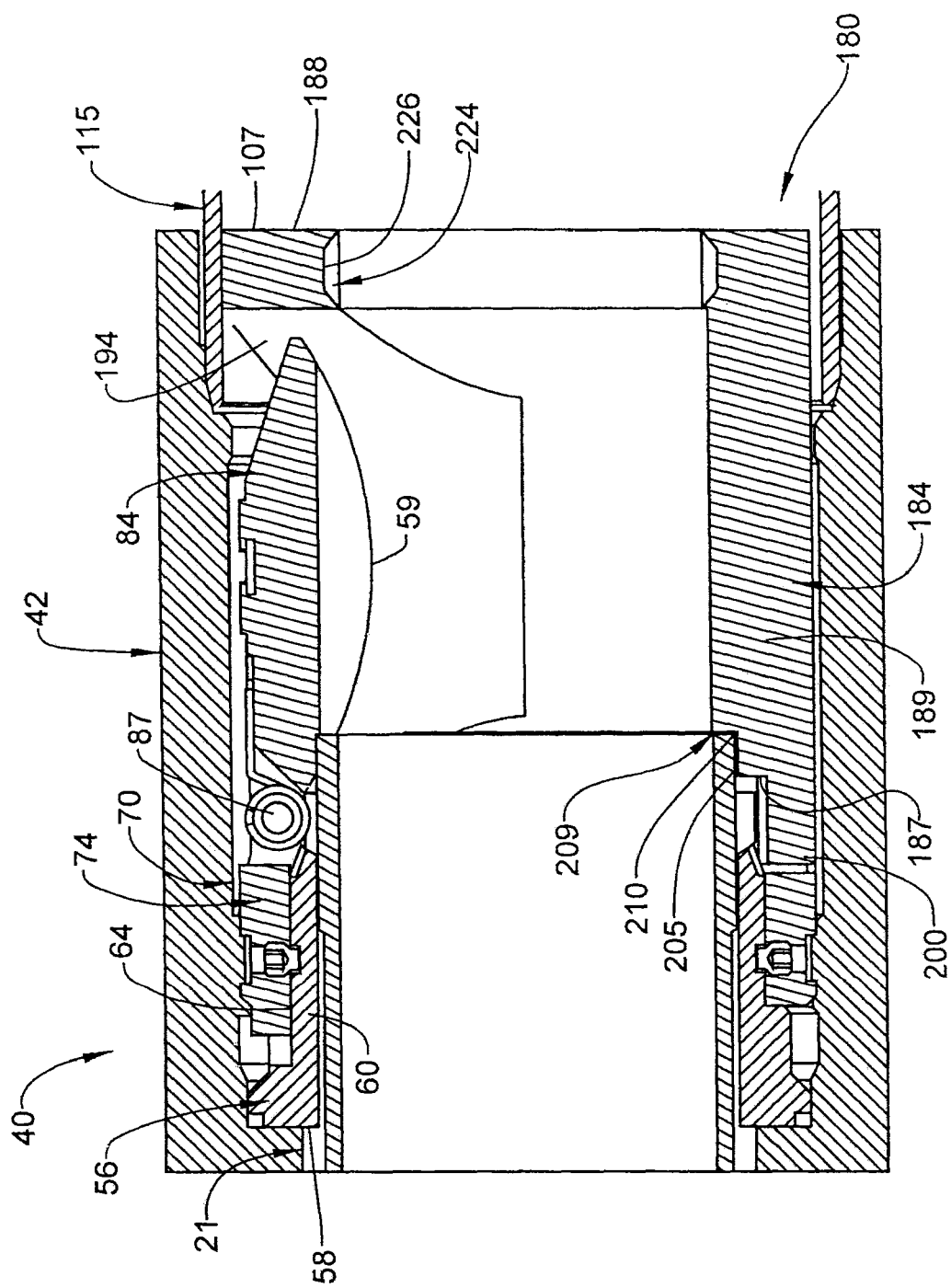
FIG. 6 depicts a flapper valve system including a flapper sleeve, in accordance with another aspect of an exemplary embodiment.

Reference will now follow to FIG. 6, wherein like reference numbers represent corresponding parts in the respective views, in describing a flapper sleeve 180 in accordance with another aspect of an exemplary embodiment. Flapper sleeve 180 includes a sleeve body 184 having a first end 187, a second end 188 and an intermediate portion 189. First end 187 may define a fluid outlet and second end 188 may define a fluid inlet. Flapper sleeve 180 includes an opening 194 formed in intermediate portion 189 that is receptive to flapper 84. Flapper sleeve 180 also includes a key element 200 that extends into flapper base 70. First end 187 defines a fluid passage 205 having a first diameter. A flow tube travel limiter 209 is provided at first end 187. Flow tube travel limiter 209 is defined by a recess 210 forming a second diameter that is less than the first diameter.

In the exemplary embodiment shown in FIG. 6, flapper sleeve 180 includes a flow conditioning member 224 arranged at second end 188. Flow conditioning member 224 may take the form of a recess 226 formed in sleeve body 184. Flow conditioning member 224 adjust a direction of travel of fluid flow passing into sleeve body 184. Specifically, flow conditioning member 224 directs fluid flowing through flapper sleeve 180 radially inwardly and away from flapper 84. In this manner, flow conditioning member 224 may further protect hinge 87 from debris and the like that may be entrained in fluids passing through flapper valve system 40.

At this point, it should be appreciated that the exemplary embodiments describe a flapper sleeve that limits ingress of a flow tube. By limiting ingress of the flow tube, the flapper sleeve may be formed having a smaller axial length than prior designs. Reducing axial length leads to a reduction in manufacturing costs which may be passed along to consumers as a lower component cost. Further, reducing manufacturing costs may permit the use of various materials previously unavailable at a desired price point for the flapper sleeve. A wider range of materials including corrosive resistant, and erosion resistant materials may be used without dramatically increasing component cost. Further, the reduction in costs may permit the use of ceramics and other such materials that would prolong component life without dramatically increasing component cost.

Embodiment 1

A flapper valve system comprising a valve body including a valve seat, a flapper base connected to the valve body, the flapper base supporting a flapper selectively positionable on the valve seat, and a flapper sleeve including a first end arranged adjacent the flapper base, a second end, and an intermediate portion having an opening receptive of the flapper, the first end including a flow tube travel limiter.

Embodiment 2

The flapper valve system according to any prior embodiment, wherein the flapper sleeve includes a key element that extends into the flapper base.

Embodiment 3

The flapper valve system according to any prior embodiment, wherein the first end includes a fluid passage having a first diameter.

Embodiment 4

The flapper valve system according to any prior embodiment, wherein the flow tube travel limiter comprises a recess formed in the first end, the recess having a second diameter that is smaller than the first diameter.

Embodiment 5

The flapper valve system according to any prior embodiment, wherein the flapper sleeve includes a flow conditioning member arranged at the second end, the flow conditioning member adjusting a direction of travel of fluid flow passing through the flapper sleeve.

Embodiment 6

The flapper valve system according to any prior embodiment, wherein the flow conditioning member defines a recess formed at the second end.

Embodiment 7

A resource exploration and recovery system comprising a first system, a second system including a plurality of tubulars fluidically connected to the first system, at least one of the plurality of tubulars including a flapper valve system comprising a valve body including a valve seat, a flapper base connected to the valve body, the flapper base supporting a flapper selectively positionable on the valve seat, and a flapper sleeve including a first end arranged adjacent the flapper base a second end and an intermediate portion having an opening receptive of the flapper, the first end including a flow tube travel limiter.

Embodiment 8

The resource exploration and recovery system according to any prior embodiment, wherein the flapper sleeve includes a key element that extends into the flapper base.

Embodiment 9

The resource exploration and recovery system according to any prior embodiment, wherein the flapper sleeve includes a fluid passage at the first end, the fluid passage having a first diameter.

Embodiment 10

The resource exploration and recovery system according to any prior embodiment, wherein the flow tube travel limiter comprises a recess formed in the first end, the recess having a second diameter that is smaller than the first diameter.

Embodiment 11

The resource exploration and recovery system according to any prior embodiment, wherein the flapper sleeve includes a flow conditioning member arranged at the second end, the flow conditioning member adjusting a direction of travel of fluid flow passing through the flapper sleeve.

Embodiment 12

The resource exploration and recovery system according to any prior embodiment, wherein the flow conditioning member defines a recess formed at the second end.

Embodiment 13

The resource exploration and recovery system according to any prior embodiment, further comprising a flow tube extending into the valve body abutting the flow tube travel limiter.

Embodiment 14

The resource exploration and recovery system according to any prior embodiment, wherein the flapper includes a hinge coupled to the flapper base, the flow tube covering the hinge.

Embodiment 15

A method of activating a flapper valve comprising inserting a flow tube through a valve body, engaging a flapper supported by a flapper base with the flow tube, shifting the flapper from a first position, to a second position with the flow tube, and limiting insertion of the flow tube at a first end of a flow sleeve abutting the flapper base.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A flapper valve system comprising:
a valve body including a valve seat and a flow path;
a flapper base connected to the valve body, the flapper base supporting a flapper having a first surface and an opposing second surface, the first surface including a sealing portion, the flapper being selectively shiftable between a closed position wherein the sealing portion is positioned on the valve seat obstructing the flow path and a second position wherein the flapper is shifted from the valve seat fully opening the flow path, wherein in all positions other than the closed position, the flapper is exposed to fluid passing along the flow path; and
a flapper sleeve including a first end arranged adjacent the flapper base, a second end, and an intermediate portion having an opening receptive of the flapper, the first end including a flow tube travel limiter defined by a recess formed on an inner surface of the flapper sleeve.

2. The flapper valve system according to claim 1, wherein the flapper sleeve includes a key element that extends into the flapper base.

3. The flapper valve system according to claim 1, wherein the first end includes a fluid passage having a first diameter.

4. The flapper valve system according to claim 3, wherein the flow tube travel limiter comprises a recess formed in the first end, the recess having a second diameter that is smaller than the first diameter.

5. The flapper valve system according to claim 1, wherein the flapper sleeve includes a flow conditioning member arranged at the second end, the flow conditioning member adjusting a direction of travel of fluid flow passing through the flapper sleeve.

6. The flapper valve system according to claim 5, wherein the flow conditioning member defines a recess formed at the second end.

7. A resource exploration and recovery system comprising:
a first system;
a second system including a plurality of tubulars fluidically connected to the first system, at least one of the plurality of tubulars including a flapper valve system comprising:
a valve body including a valve seat and a flow path;
a flapper base connected to the valve body, the flapper base supporting a flapper having a first surface and an opposing second surface, the first surface including a sealing portion, the flapper being selectively shiftable between a closed position wherein the sealing portion is positioned on the valve seat obstructing the flow path and a second position wherein the flapper is shifted from the valve seat fully opening the flow path, wherein in all positions other than the closed position, the flapper is exposed to fluid passing along the flow path; and
a flapper sleeve including a first end arranged adjacent the flapper base a second end and an intermediate portion having an opening receptive of the flapper, the first end including a flow tube travel limiter defined by a recess formed on an inner surface of the flapper sleeve.

8. The resource exploration and recovery system according to claim 7, wherein the flapper sleeve includes a key element that extends into the flapper base.

9. The resource exploration and recovery system according to claim 7, wherein the flapper sleeve includes a fluid passage at the first end, the fluid passage having a first diameter.

10. The resource exploration and recovery system according to claim 9, wherein the flow tube travel limiter comprises a recess formed in the first end, the recess having a second diameter that is smaller than the first diameter.

11. The resource exploration and recovery system according to claim 7, wherein the flapper sleeve includes a flow conditioning member arranged at the second end, the flow conditioning member adjusting a direction of travel of fluid flow passing through the flapper sleeve.

12. The resource exploration and recovery system according to claim 11, wherein the flow conditioning member defines a recess formed at the second end.

13. The resource exploration and recovery system according to claim 7, further comprising a flow tube extending into the valve body abutting the flow tube travel limiter.

14. The resource exploration and recovery system according to claim 13, wherein the flapper includes a hinge coupled to the flapper base, the flow tube covering the hinge.

15. A method of activating a flapper valve comprising:
inserting a flow tube through a valve body;
engaging a flapper supported by a flapper base with the flow tube;
shifting the flapper from a closed position, to an open position with the flow tube; and
limiting insertion of the flow tube with a travel limiter defined by a recess formed at a first end of an inner surface of a flapper sleeve, wherein in all positions other than the closed position, the flapper is exposed to fluid passing through the valve body.

* * * * *